United States Patent
Gibbs (12) 
(10) Patent No.: US 6,862,838 B1
(45) Date of Patent: Mar. 8, 2005

(54) FISHING LEADER APPARATUS AND METHOD OF MAKING SAME

(76) Inventor: William F. Gibbs, 4927 Toronto Way, Sacramento, CA (US) 95820

( * ) Notice: Subject to any disclaimer, the term of this patent is extended or adjusted under 35 U.S.C. 154(b) by 0 days.

(21) Appl. No.: 10/884,079

(22) Filed: Jul. 3, 2004

(51) Int. Cl.$^7$ .............................................. A01K 91/00
(52) U.S. Cl. .................... 43/44.98; 43/42.74; 43/43.15; 43/44.83
(58) Field of Search ............... 43/44.98, 43.1, 43/42.74, 43.12, 43.15, 44.83, 44.84

(56) References Cited

U.S. PATENT DOCUMENTS

| | | | | |
|---|---|---|---|---|
| 2,392,147 A | * | 1/1946 | Hickson .................... | 43/42.74 |
| 3,426,468 A | * | 2/1969 | Hinkson .................... | 43/42.74 |
| 3,744,178 A | * | 7/1973 | Denny ....................... | 43/42.74 |
| 3,939,595 A | * | 2/1976 | Lockett ..................... | 43/43.12 |
| 3,943,652 A | * | 3/1976 | Aunspaugh ............... | 43/42.74 |
| 3,968,587 A | * | 7/1976 | Kammeraad ............... | 43/27.4 |
| 4,069,611 A | * | 1/1978 | Dusich et al. ............. | 43/43.12 |
| 5,267,409 A | * | 12/1993 | Voss .......................... | 43/42.74 |
| 5,444,936 A | * | 8/1995 | McDonald ................. | 43/42.74 |
| 5,608,986 A | * | 3/1997 | Spurgeon et al. .......... | 43/43.13 |
| 5,881,490 A | * | 3/1999 | Richardson ................ | 43/44.2 |

* cited by examiner

*Primary Examiner*—Teri P. Luu
*Assistant Examiner*—T. Nguyen
(74) *Attorney, Agent, or Firm*—Dennis A. DeBoo (57) ABSTRACT

Non-trolling fishing leader apparatus comprised of a single braided steel cable having a first end portion coupled to a fishing line supplied from a rod and real and having a second end portion coupled to a baited hook or lure such that leader apparatus is devoid of external weights attached thereon and proximate the baited hook or lure and is comprised of a designated length, weight, and rigidity for keeping it elongated along a bottom of a body of water when cast and set for providing a substantially impulse free response to a big game fish taking the baited hook or lure without having the unnatural feel or counter force of external weights and further including a weighted element slideably coupled to the fishing line for sliding on the fishing line in response to the fish for continuing the natural impulse response for securely catching big game fish.

3 Claims, 4 Drawing Sheets

FISHING LEADER APPARATUS AND METHOD OF MAKING SAME

FIELD OF THE INVENTION

This invention relates generally to a fishing leader apparatus and method of making same and, in particular, to a non-trolling fishing leader apparatus devoid of external leader weight, to a method of making same, and to its use thereafter for successfully catching big game fish such as sturgeon, shark, rays, and barndoor halibut.

BACKGROUND OF THE INVENTION

Heretofore, a variety of trolling and non-trolling rigs or leaders have been provided for increasing the experience and success of catching fish.

For example, U.S. Pat. No. 5,608,986 issued on Mar. 11, 1997 to Spurgeon, et al.; U.S. Pat. No. 4,069,611 issued on Jan. 24, 1978 to Dusich, et al.; U.S. Pat. No. 3,968,587 issued on Jul. 13, 1976 to Kammeraad; and U.S. Pat. No. 3,426,468 issued on Feb. 11, 1969 to Hinkson disclose a variety of multi-line trolling rigs or leaders which are used for catching fish from a moving boat and which employ weights attached at a lower end of the rig or leader for sinking the leader or lure to a depth while trolling.

Additionally, and for example, U.S. Pat. No. 5,881,490 issued on Mar. 16, 1999 to Richardson discloses a multi-hook trolling rig for fishing by trailing the multi-hook trolling rig from a moving boat.

Furthermore, and for example, U.S. Pat. No. 3,943,652 issued on Mar. 16, 1976 to Aunspaugh and U.S. Pat. No. 2,392,147 issued on Jan. 1, 1946 to Hickson disclose multi-hook and multi-line fishing rigs or leaders having weights attached at a lower end of the rig or leader, distal from a fishing line supplied from a rod and real and proximate to a hook coupled to the multi-hook and multi-line rig or leader. This arrangement is problematic in that multi-hook and multi-line fishing rigs or leaders tend to become entangled due to multiple extensions from the fishing line supplied from the rod and real. Additionally, weights attached at a lower end of the rig or leader, distal from a fishing line supplied from a rod and real and proximate to a hook or lure coupled to the rig or leader, provides an unnatural resistance or impulse to a striking fish or a fish taking the bait as a result of the weight proximate the hook providing the fish with a heavier than expected feel to the bait.

Thus, there continues to be a need to improve and discover new fishing rigs and leaders for increasing the experience and success of catching big fish and, in particular, there is a need for a non-trolling fishing rig or leader which increases the experience and success of catching big game fish, which provides a more natural impulse response to a striking fish or a fish taking the bait than the known prior art for successfully catching big game fish, and which will not break due to the tremendous strength of big game fish, which will not be cut due to their teeth, and which can be used repeatedly for catching big game fish.

BRIEF SUMMARY OF THE INVENTION

The present invention is distinguished over the known prior art in a multiplicity of ways. For one thing, one embodiment of the invention provides a single braided steel cable non-trolling fishing leader apparatus and method of making same such that its length, weight, and rigidity keeps the non-trolling fishing leader apparatus substantially horizontal on or conforming with the bottom of a bay, river, lake or any other body of water and such that the non-trolling fishing leader apparatus is devoid of external leader weights and also devoid of weighted elements attached to the end of the leader proximate the baited hook or lure.

In one embodiment of the invention, the non-trolling fishing leader apparatus is comprised of a single braided steel cable using figure-eight crimps at each end of the cable for forming a loop at each end of the cable wherein one loop at one end captures a first barrel swivel operatively coupled to a fishing line supplied from a rod and real and wherein the other loop at the other end captures a second barrel swivel which, in turn, is operatively coupled to a clasp member capturing a baited hook or lure such that the non-trolling fishing leader apparatus is of a length, weight, and rigidity for keeping it substantially horizontal on or conforming with the bottom of a bay, river, lake or any other body of water when cast and set such that the baited hook or lure extends from the substantially horizontal non-trolling fishing leader devoid of external leader weights and also devoid of weighted elements attached to the end of the leader proximate the baited hook or lure for catching a big game fish by a taking of the bait means by the big game fish such that a substantially impulse free response is asserted on the big game fish as the big game fish lifts the bait means devoid of external weights proximate thereto and continues to lift the single braided steel cable non-trolling fishing leader apparatus having a substantially evenly distributed weight along its length and devoid of external weights attached continuing the natural impulse response for securely catching big fish.

Additionally, an embodiment of the invention provides a non-trolling fishing leader apparatus that substantially will not break due to the tremendous strength of big game fish, that will substantially not be cut due to their teeth, and that can be used repeatedly for catching big game fish.

Furthermore, an embodiment of the invention provides a non-trolling fishing leader apparatus that is further comprised of a sliding weight device comprised of a weighted element operatively coupled to a sleeve circumscribing the fishing line supplied from the rod and real such that the weight is slideably coupled to the fishing line at location between the rod and the first barrel swivel distal from the coupling of the baited hook or lure wherein the sliding weight device and thus, the weighted element slides on the fishing line in response to the taking of the bait means by the big game fish for continuing the natural impulse response of the leader for securely catching big fish.

Moreover, having thus summarized the invention, it should be apparent that numerous modifications and adaptations may be resorted to without departing from the scope and fair meaning of the present invention as set forth hereinbelow by the claims.

DETAILED DESCRIPTION OF THE INVENTION

Considering the drawings, wherein like reference numerals denote like parts throughout the various drawing figures, reference numeral 10 is directed to a non-trolling fishing leader apparatus and method of making same for successfully catching big game fish.

Figure 1:
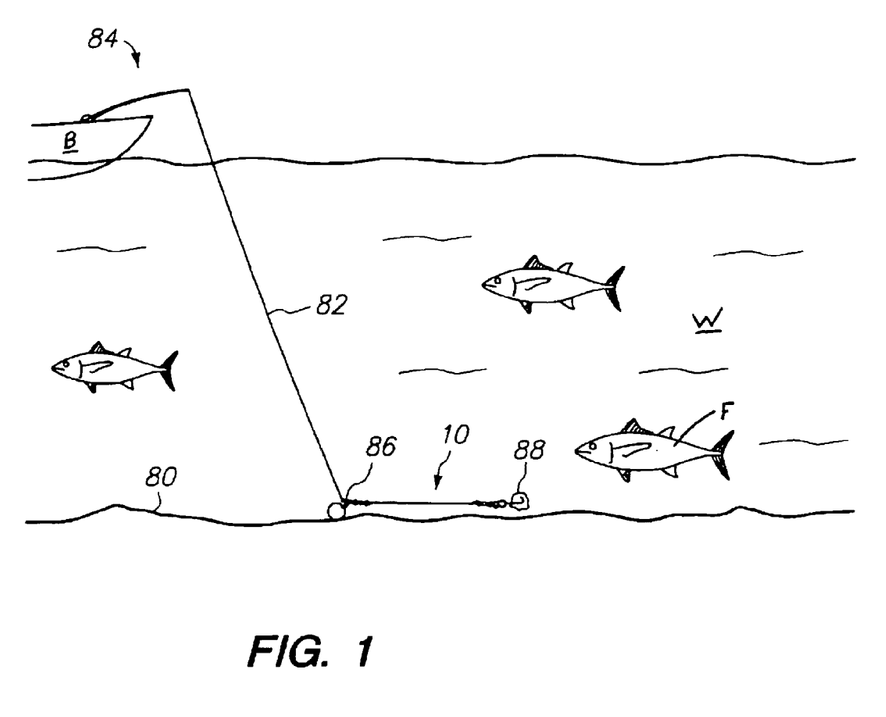
FIG. 1 is a perspective view of a single line non-trolling leader for big game fish shown in its environment.
Figure 2:
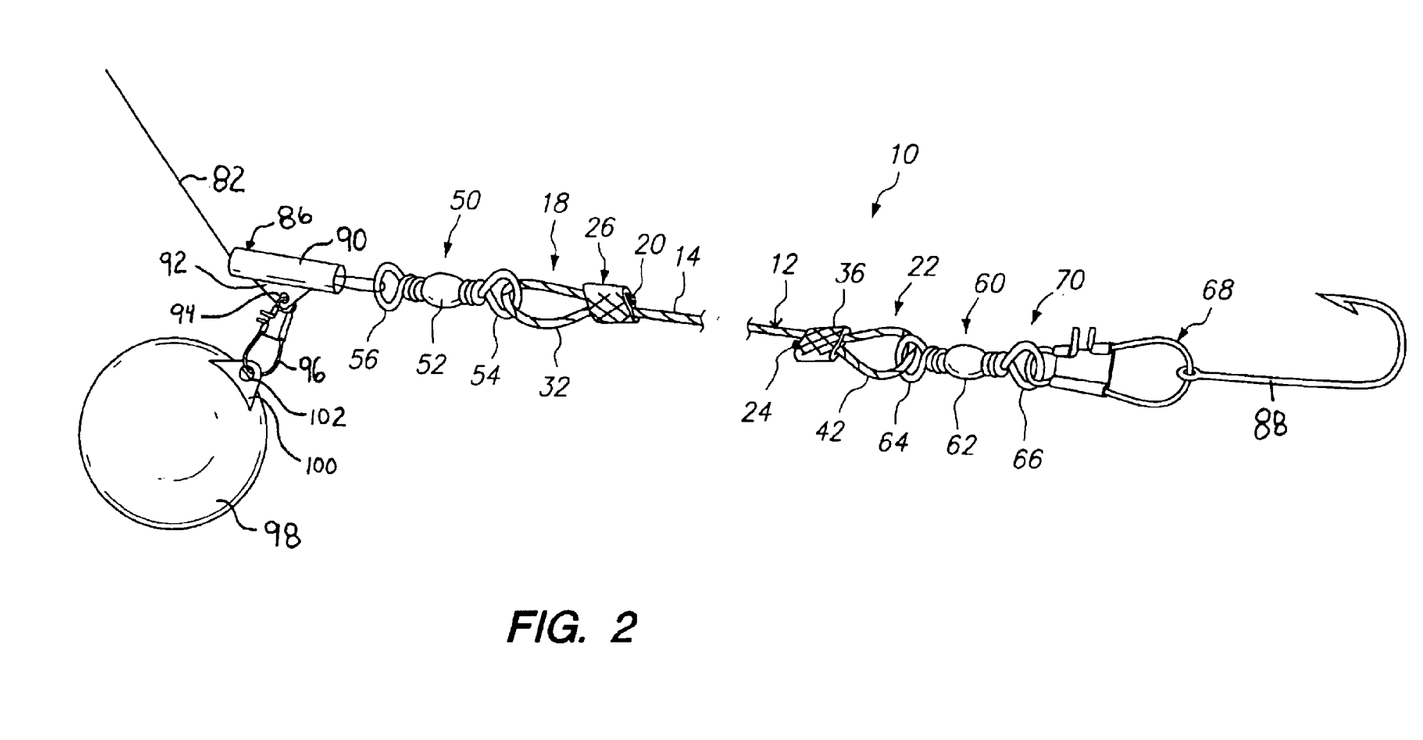
FIG. 2 is an elevational view of the single line non-trolling leader for big game fish.

In its essence, and referring to FIGS. 1 and 2, an embodiment of the invention provides a non-trolling fishing leader apparatus 10 having a length, weight, and rigidity for keeping the apparatus 10 substantially horizontal on or substantially conforming with the bottom 80 of a bay, river, lake or any other body of water W and comprised of a single braided steel cable 12 devoid of external leader weights and including a cable body 14 having a first end portion 18 coupled to a fishing line 82 supplied from a rod and real 84 via a first barrel swivel 50 and having a second end portion 22 coupled to a bait means such as a baited hook 88 or lure via a swivel and clasp combination member 70 wherein the second end portion 22 is devoid of external weight attachments such that when the non-trolling fishing leader apparatus 10 is cast and set the apparatus 10 lays substantially horizontal on or substantially conforms with the bottom 80 of the body of water W such that the bait means 88 extends from the second end portion 22 of the non-trolling fishing leader apparatus 10 which is also devoid of external weights proximate the bait means for giving a more impulse free response due to a strike or the taking of the bait means by a fish such that the non-trolling fishing leader apparatus 10 provides a gradual weight distribution along its length for providing a natural feel for successfully catching big game fish without the unnatural feel provided from external weights coupled to the leader and/or proximate the hook means.

Additionally, an embodiment of the invention provides a non-trolling fishing leader apparatus 10 that is further comprised of a sliding weight device 86 comprised of a weighted element 98 operatively coupled to a sleeve 90 circumscribing the fishing line 82 supplied from the rod and real 84 such that the weight 98 is slideably coupled to the fishing line 82 at location between the rod and real 84 and the first barrel swivel 50 and distal from the coupling of the baited hook or lure 88 such that the sliding weight device 86 slides on the fishing line 82 in response to the fish caught on the hook 88 and picking up the leader device 10 for continuing the natural or smooth impulse response of the leader as compared with rigidly or statically attached weights for increasing the experience and success of catching big fish.

More specifically, and referring to FIGS. 1 and 2, the non-trolling fishing leader apparatus 10 for catching big game fish F is comprised of a single braided steel cable 12 devoid of external leader weights and comprised of a cable body 14 including a plurality of braided steel wires 16 having a length, weight, and rigidity for keeping the single braided steel cable 12 substantially horizontal on or substantially conforming with a bottom 80 of a body of water W. The single braided steel cable 12 is further comprised of a first end portion 18 having a first end 20 and second end portion 22 having a second end 24. The single braided steel cable 12 preferably has a total length of approximately forty inches and is a one sixteenth inch 7 by 7 steel aircraft cable having an approximate weight of 3.8 pounds per five hundred feet.

Figure 3:
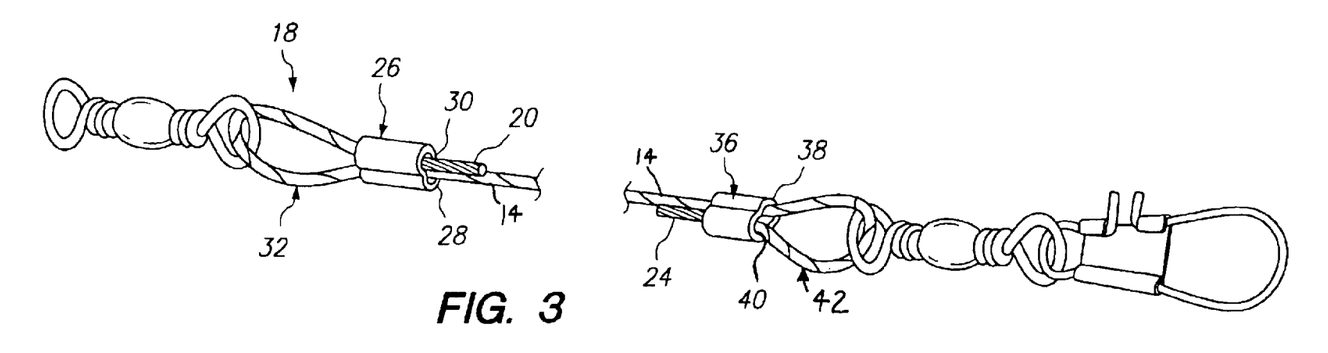
FIG. 3 is an elevational partial exploded parts view showing the pair of figure-eight crimps on the line at both respective ends but net yet crimped and further showing the free ends of the line looped and capturing a barrel swivel at one end and a barrel swivel and clasp combination at another end.
Figures 4, 5, 6:
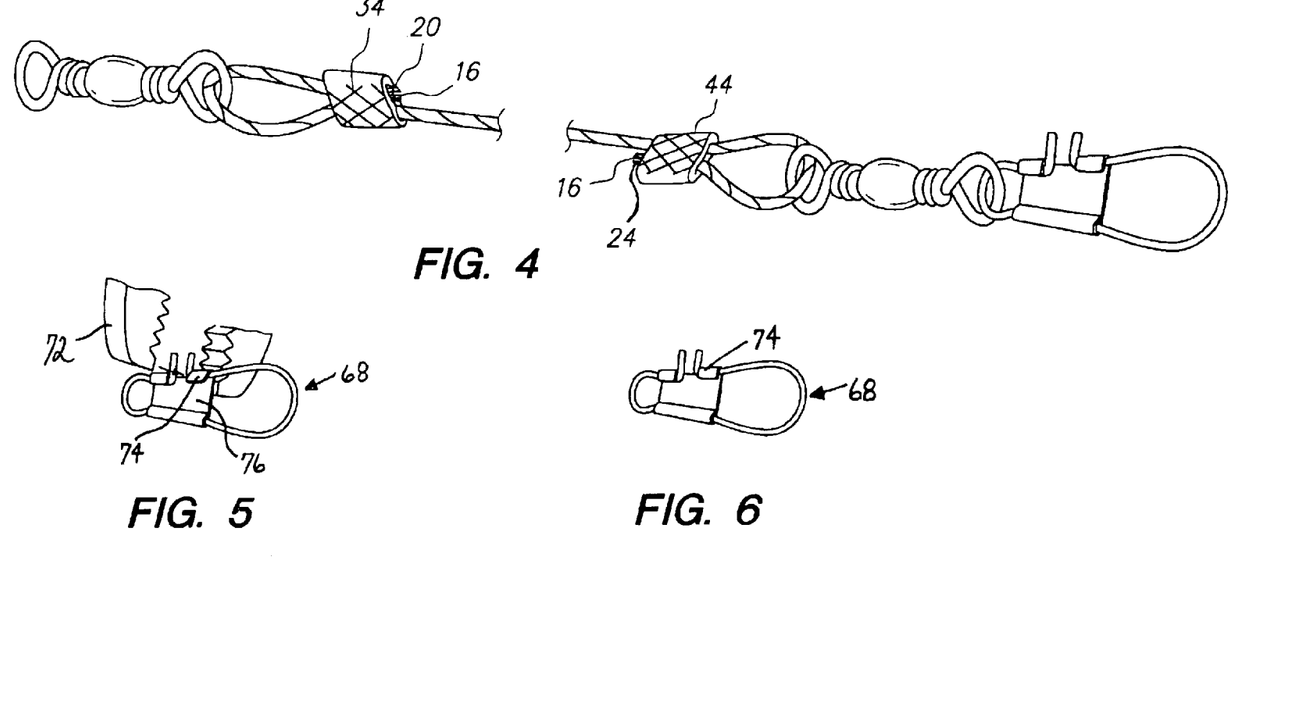
FIG. 4 is a top elevational view showing the figure-eight crimps crimped at both ends.
FIG. 5 is a top elevational view showing the clasp before crimping and with pliers on it.
FIG. 6 is a top elevational view showing the clasp after crimping.

Referring to FIGS. 3 and 4, the non-trolling fishing leader apparatus 10 is further comprised of a first deformable figure-eight shaped crimp 26 having a first opening 28 capturing the cable body 14 at the first end portion 18 of the cable 12 and a second opening 30 capturing the first end 20 of the single braided steel cable 12 such that when the first figure-eight shaped crimp 26 is deformed substantially flat about the body 14 and the first end 20 of the single braided steel cable 12 the individual braided steel wires 16 of the single braided steel cable 12 located at the first end 20 are spread out and gripped by the crimp 26 (FIG. 3) for securely locking the first end 20 to the cable body 14 for forming a first closed looped end 32. The first deformable figure-eight shaped crimps is preferably a one sixteenth inch copper zinc alloy figure-eight crimp having an approximate weight of 1.5 grams and a length of approximately one millimeter.

The non-trolling fishing leader apparatus 10 is further comprised of a second deformable figure-eight shaped crimp 36 having a first opening 38 capturing the cable body 14 at the second end portion 22 and a second opening 40 capturing the second end 24 of the single braided steel cable 12 such that when the second figure-eight shaped crimp 36 is deformed substantially flat about the body 14 and the second end 24 of the single braided cable 12 the individual strands 16 of the single braided steel cable 12 located at the second end 24 are spread out and gripped by the crimp 36 (FIG. 3) for securely locking the second end 24 to the cable body 14 for forming a second closed looped end 42. The second deformable figure-eight shaped crimp 36 is preferably a one sixteenth inch copper zinc alloy figure-eight crimp having an approximate weight of 1.5 grams and a length of approximately one millimeter.

Referring back to FIG. 2, the non-trolling fishing leader apparatus 10 further includes a first barrel swivel 50 comprised of a barrel 52 flanked by a first eyelet 54 and a second eyelet 56 which swivel with respect to the barrel 52 wherein the first eyelet 54 is coupled to the fishing line 82 of the rod and reel fishing pole 84 and wherein the second eyelet 56 has the first end 20 threaded there through prior to the first end 20 being securely locked to the cable body 14 with the first deformable figure-eight shaped crimp 36. The first barrel swivel 50 preferably has a 3/0 size, an approximate weight of 4 grams, and a length of approximately 3.6 millimeters.

The non-trolling fishing leader apparatus 10 is further includes of a swivel and clasp combination member 70 comprised of a second barrel swivel 60 and an open and closeable clasp 68. The second barrel swivel is comprised of a barrel 62 flanked by a first eyelet 64 and a second eyelet 66 which swivel with respect to the barrel 62 wherein the first eyelet 64 has the second end 24 of the cable 12 threaded there through prior to the second end 24 being securely locked to the cable body 14 with the second deformable figure-eight shaped crimp 36 and wherein the second eyelet 66 is coupled to an open and closeable clasp 68 which, in turn, is coupled to bait means 88 such as a baited hook or lure and which defines the second barrel swivel and clasp combination member 70 devoid of external weight attachments such that when the non-trolling fishing leader apparatus 10 is cast and set the non-trolling fishing leader apparatus 10 lays substantially horizontal on or conforms with the bottom 80 of the body of water W such that the bait means 88 extends from the second end portion 22 of the non-trolling fishing leader apparatus 10 which is devoid of external leader weights proximate the bait means 88 for giving a more impulse free response due to a strike by a fish such that the bait means 88 provides a natural feel for successfully catching big game fish without an unnatural feel provided from external weight attachments proximate the bait means 88. Preferably the second barrel swivel has a 3/0 size and the clasp includes a interlock snap modified by employing a pair of pliers, such as a pair of small gauge needle point pliers and squeezing the snap end clip holder 74 in towards a metal strengthening member 76 as shown in FIG. 5 such that the snap end clip holder 74 is closed as shown in FIG. 6 and wherein the second barrel swivel and clasp combination member 70 is approximately 7.8 millimeters in length and weighs approximately 6 grams.

Additionally, and in one embodiment of the invention, the non-trolling fishing leader apparatus 10 further includes a sliding weight device 86 comprised of an opened ended hollow elongated sleeve 90 and a weighted element 98 (FIG. 2). The opened ended hollow elongated sleeve 90 circumscribes the fishing line 82 supplied from the rod and real 84 and is slideably coupled thereto and is further comprised of a triangular protrusion 92 attached to and extending from an exterior cylindrical surface of the sleeve 90 and terminating to a curved apex having a hole 94 disposed therein for receiving a clasp 96 which, in turn, is also received within a hole 100 of a protrusion 102 attached to and extending from an exterior surface of the weighted element 98 for coupling the weighted element 98 to the sliding sleeve 90 such that the sleeve 90 and the weighted element 98 are both slideably coupled to the fishing line 82 at location distal from the coupling of the baited hook or lure 88 and between the first barrel swivel 50 and the rod and real 84 such that the sliding weight device 86 slides on the fishing line 82 in response to the fish being caught on the hook 88 and picking up the leader device 10 thereby continuing to provide a natural or smooth impulse response of the leader as compared with rigidly or statically attached weights for increasing the experience and success of catching big fish.

Referring to FIGS. 1 through 7, and in light of the above description, one embodiment of the invention includes a method for making the non-trolling fishing leader apparatus 10 free of external leader weights, the steps including: Initially providing a cable 12 or a roll 100 of cable 12 preferably in the form of a one sixteenth (1/16) inch 7 by 7 steel aircraft cable or braided wire rope having a galvanized finish and having an approximate weight of 3.8 pounds per 500 feet of cable. The next steps can include providing a cable box 102 on a top of a work surface 104, the cable box 102 having a cable guide aperture 106 extending through a side of the cable box 102 and then, placing the cable roll 100 in the cable box 102 and threading an end of the cable from within an interior of the cable box 102, through the cable guide aperture 106, and out to an exterior of the cable box 102 such that the cable box 102 substantially precludes cable twist and provides assistance in holding the cable 12 during a subsequent measurement step.

Figure 7:
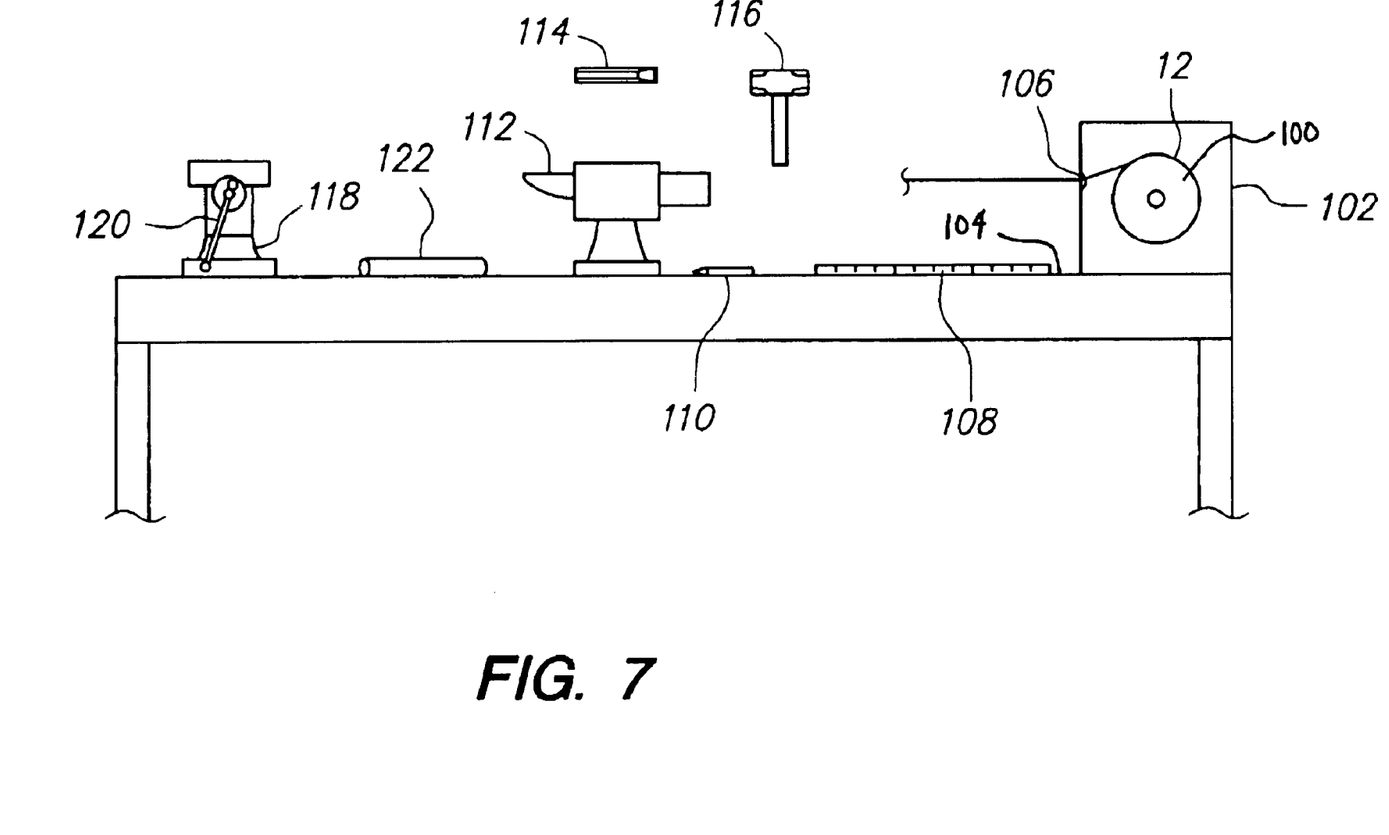
FIG. 7 is a diagrammatic view of one embodiment of an assembly line apparatus used for making a single line non-trolling leader for big game fish.

Then, the next steps include: gripping the end of the cable 12 exterior of the cable box 102 and pulling a length of cable through the cable guide aperture 106 such that a length of at least thirty six (36) inches of cable is pulled from the box and measured with a ruler 108, and then four (4) inches more is pulled from the box and measured with the ruler 108 or such that a length of at least approximately forty (40) inches is pulled from the cable box 102 and measured with the ruler 108.

Then, the next steps include: marking the forty inches spot on the cable with a marker 110; placing the marked spot on the cable on an anvil 112; using a chisel 114, preferably a cobalt chisel, placed substantially perpendicular to and on top of the cable and striking a hard blow or blows on the chisel 114 using a large hammer 116 such as a five (5) pound sledge hammer for cutting a straight rather than an angle cut of the measured cable length wherein if the chisel is not maintained substantially perpendicularly to the cable for providing sufficient force to cut the cable preferably on a first blow for precluding frying and sharp ends of the cable which may interfere with the fish taking the bait if the frayed or sharp end is proximate the bated hook or lure. Thus, a cable 12 having a frayed or sharp end should be discarded thereby resulting in loss of materials and labor.

After cutting the cable 12 from the cable role, the next steps include: placing a first figure-eight crimp 26, preferably a one sixteenth (1/16) inch figure-eight crimp, on a first end portion 18 of the cable 12 by threading a first end 20 of the first end portion 18 of the cable 12 through a first opening 28 of two openings disposed in the first figure-eight crimp 26 such that it extends, for example, approximately between 1.5 to 2 inches beyond the first figure-eight crimp 26; placing the first barrel type swivel 50 on the first end portion 18 of the cable 12 by threading the first end 20 of the first end portion 18 of the cable 12 through the first eyelet 54 of two diametrically opposed eyelets of the barrel swivel 50 such that the first eyelet 54 is between the first end 20 and the first figure-eight crimp 26 and, such that the eyelets 54, 56 swivel with respect to the barrel 52 of the barrel swivel 50; folding back the first end 20 of the cable 12 toward the body 14 of the cable 12 and threading the first end 20 through the remaining or second opening 30 of the two openings disposed in the first figure-eight crimp 26 such that the first closed loop 32 is defined and the first barrel swivel 50 is captured.

With the cable 12 threaded through the first and second crimp openings 28, 30 disposed in the first figure-eight crimp 26, the next steps include adjusting the threading of the cable 12 through the two crimp openings 28, 30 such that the first defined loop 32 is adjusted to approximately three quarters (3/4) of an inch at its widest point and such that the first end 20 traversing through the second opening 30 extends approximately at least a one quarter (1/4) inch in length beyond the first figure-eight crimp 26 prior to the first end 20 terminating wherein if the first defined loop 32 is wider than approximately three quarters (3/4) of an inch at its widest point then there would be to much free play in the non-trolling fishing leader apparatus 10 when fighting a big game fish increasing the chances of a lost fish and, in contrast, if the loop is smaller than approximately three quarters (3/4) of an inch at its widest point then there would be not enough free play in the leader such that big game fish would be able to throw the bait means (dislodge hook means) resulting in loss of game fish and wherein if one quarter (1/4) inch of cable is not left out or extending beyond the crimp 26 then there will not be enough free cable to adjust itself to pressures from a subsequent vise or crimping step explained below such that the non-trolling fishing leader apparatus 10 would have to be discarded resulting in loss of materials and time.

Then, the next steps include: retaining the position of the first figure-eight crimp 26 after the adjusting step and placing the first figure-eight crimp 26 in a vise 118 such that the first figure-eight crimp 26 and first loop 32 are in a plan substantially parallel to jaws of the vise 118 and the first figure-eight crimp 26 is in between the jaws of the vise 118 or, in other words, the first figure-eight crimp 26 is not titled with respect to the faces of the jaws of the vise 118 such that that jaws, which may be ribbed, contact a front and back area which are greater in size than side areas of the first figure-eight crimp 26 as shown; closing the vise 118 by, for example, using a steel pipe 122 over a hand crank 120 of the vise 118 for applying a great force on the first figure-eight crimp 26 for flatting the first figure-eight crimp 26 and spreading the braids or wires 16 of the single steel cable 12 particularly the braids br wires 16 at the first end 20 for providing cable grip for securely locking the first end 20 to the cable body 14 and closing the first loop defining the first closed loop 32 and then, opening the vise 118, rotating the crimp one hundred eighty (180) degrees, placing the first figure-eight crimp 26 between the jaws of the vise 118 such that the first figure-eight crimp 26 and first loop 32 are in a plan substantially parallel to the jaws of the vise, and closing the vise by, for example, using the steel pipe 122 over the hand crank 120 of the vise 118 for applying a great force on the first figure-eight crimp 26 for further flatting the first figure-eight crimp 26 for securely locking the first end 20 to the cable body 14 and further closing the first loop defining the first closed loop 32. It should be noted that if the crimp and loop are not in a parallel plan with respect to the vise jaws when the crimp is flattened then the two cable ends forming the loop will not be in the correct position resulting in cable slide and possible loss of game fish due to leader apparatus 10 malfunction thereby resulting in lost time and equipment. Additionally, markings 34 are formed on the exterior surfaces of the first figure-eight crimp 26 if the vise jaws are ribbed.

Then, the next steps include: locating a chisel 114, preferably a cobalt chisel, adjacent the second opening 30 of the first figure-eight crimp 26 and on the one quarter (¼) inch or remaining length of the cable 12 extending out the second opening 30 of the first figure-eight crimp 26 such that the chisel 114 is substantially perpendicular to the cable 12 for obtaining a straight rather than an angle cut through the quarter inch or remaining length of cable extending out the second opening 30 of the first figure-eight crimp 26; striking a hard blow or blows on the chisel 114 using the large hammer 116 for trimming the one quarter (¼) inch or remaining length of the cable extending out the second opening 30 of the first figure-eight crimp 26. It should be noted that if the chisel 114 is not maintained substantially perpendicularly to the cable 12 when trimming the one quarter inch extension then fraying of ends and extra cut ends of braided wire 16 of the cable 12 will be felt by game fish such that the fish will suspect something wrong or not natural in bait presentation and may not take or bite bait.

After the above trimming step, the next steps include: placing a second figure-eight crimp 36, preferably a one sixteenth (1/16) inch second figure-eight crimp 36, on a second end portion 22 of the cable 12 by threading a second end 24 of the second end portion 22 of the cable 12 through the first opening 38 of two openings disposed in the second figure-eight crimp 36 such that the second end 24 of the cable 12 traverses through the second figure-eight crimp 36 and beyond such that a length of cable adjacent the second end 24 extends, for example, approximately between 1.5 to 2 inches beyond the second figure-eight crimp 36; placing a second barrel type swivel 60 of a barrel swivel and clasp combination member 70 on the second end portion 22 of the cable 12 by threading the second end 24 of the second end portion 22 of the cable 12 through a first eyelet 64 of two diametrically opposed eyelets 64, 66 of the second barrel swivel 60 such that the eyelet 64 is between the second end 24 and the second figure-eight crimp 36 and, such that the eyelets 64, 66 swivel with respect to the second barrel 62 of the second barrel swivel 60; folding back the second end 24 of the cable 12 toward the body 14 of the cable 12 and threading the second end 24 through the remaining or second opening 40 of the two openings disposed in the second figure-eight crimp 36 such that a second closed loop 42 is defined and the second barrel swivel 60 is captured.

With the cable 12 threaded through the first and second crimp openings 38, 40 disposed in the second figure-eight crimp 36, the next steps include: adjusting the threading of the cable 12 through the two crimp openings 38, 40 of the second figure-eight crimp 36 such that the second closed loop 42 is approximately three quarter (¾) of an inch at its widest point and such that the second end 24 traversing through the second opening 40 extends approximately at least one quarter (¼) inch in length beyond the second crimp 36 prior to the second end 24 terminating wherein if the second closed loop 42 is wider than approximately three quarters (¾) of an inch at its widest point then there would be to much free play in the leader when fighting a big game fish increasing the chances of a lost fish and, in contrast, if second closed loop 42 is smaller than approximately three quarters (¾) of an inch at its widest point then there would be not enough free play in the leader such that big game fish would be able to throw the bait means (dislodge hook means) resulting in loss of game fish and wherein if one quarter inch of cable is not left out or extend beyond the second crimp 36 then there will not be enough free cable to adjust itself to pressures from the subsequent vise or crimping step such that the cable would have to be discarded resulting in loss of materials and time.

Then, the next steps include: retaining the position of the second crimp 36 and placing it in the vise 118 such that the second crimp 36 and second loop 42 are in a plan substantially parallel to the jaws of the vise 118 and the second crimp 36 is in between the jaws of the vise 118 or, in other words, the second crimp 36 is not titled with respect to the faces of the jaws of the vise 118 such that that jaws, which may be ribbed, contact a front area and a back area of the second crimp 36 which are greater in size than side areas of the second crimp as shown; closing the vise 118 by, for example, using the steel pipe 122 over the hand crank 120 of the vise 118 for applying a great force on the second crimp 36 for flatting the second crimp 36 such that its cross sectional area transforms from a figure-eight shape to a substantially flat shape and spreading the braids of the steel braided cable particularly the braids at the second end 24 for providing cable grip for securely locking the second end 24 to the cable body 14 and closing the second loop defining the second closed loop 42; opening the vise, rotating the second crimp one hundred eighty degrees, placing the second crimp 36 between the jaws of the vise 118 such that the second crimp 36 and second loop 42 are in a plan substantially parallel to the jaws of the vise 118, and closing the vise by, for example, using the steel pipe 122 over the hand crank 120 of the vise 118 for applying a great force on the second crimp 36 for further flatting the second crimp 36 for securely locking the second end 24 to the cable body 14 and closing the second loop for defining the second closed loop 42. It should be noted that if the crimp and loop are not in a parallel plan with respect to the vise jaws when the crimp is flattened then the two cable ends forming the loop will not be in the correct position resulting, when in use, in cable slide and possible loss of game fish due to leader malfunction thereby resulting in lost time and equipment. Additionally, markings are formed on the exterior surfaces of the second figure-eight crimp 36 if the vise jaws are ribbed.

Then, the next steps include: locating the chisel 114, preferably a cobalt chisel, adjacent the second opening 40 of the second figure-eight crimp 36 and on the one quarter (¼) inch or remaining length of the cable extending out the second opening 40 of the second figure-eight crimp 36 such that the chisel 114 is substantially perpendicular to the cable 12 for obtaining a straight rather than an angle cut through the quarter inch or remaining length of cable extending out the second opening 40 of the second figure-eight crimp 36; striking a hard blow or blows on the chisel 114 using a large hammer 116 such as a five (5) pound sledge hammer for trimming the one quarter (¼) inch or remaining length of the cable extending out the second opening 40 of the second figure-eight crimp 36. It should be noted that if the chisel 114 is not maintained substantially perpendicularly to the cable 12 when trimming the one quarter inch extensions then fraying of ends and extra cut ends of braided wires of the cable will be felt by game fish such that the fish will suspect something wrong or not natural in bait presentation and may not take or bite bait.

Then, the next step can include: modifying the clasp 68 of the barrel swivel and clasp combination member by employing a pair of pliers, such as a pair of small gauge needle point pliers and squeezing the snap end clip holder 74 in towards the metal strengthening member 76 of the clasp 68 as shown in FIG. 5 such that the snap end clip holder 74 of the clasp 68 is closed as shown in FIG. 6. Note that this step can be preformed prior to the coupling of the barrel swivel and clasp combination member 70 to the second end portion 22 of the leader apparatus 10.

A final step in the method of making the non-trolling fishing leader apparatus 10 free of external leader weights includes checking the precision of each finished non-trolling fishing leader apparatus 10.

In use and operation, and referring to the drawings, one embodiment of the invention includes providing the non-trolling fishing leader apparatus 10 which can further include the sliding weight device 86 as delineated in detail hereinabove, a method of making same as delineated hereinabove, and a method of use thereafter.

In the method of use, an initial step includes providing the rod and reel including fishing line having a loose end and an end coupled to the rod and reel. For example, this step can include providing a rod and real capable of holding two hundred fifty yards or more of fishing line 82 having, for example, an eighty pound or better test result.

A next method of use step, in one embodiment, includes sliding a sleeve 90 of the sliding weight device 86 over the fishing line by passing the loose end of the line through the sleeve and then a next method of use step includes securely coupling, such as by tying, the loose end of the fishing line to a first eyelet 54 coupled at first end portion of the leader apparatus 10. A next method of use step includes providing a baited hook or lure removably coupled to a second end portion of the leader apparatus 10 by way of a clasp 68 coupled to a second end portion of the leader apparatus by way of the second barrel swivel.

A next method of use step includes casting the leader apparatus 10 into a body of water W from a still position such as a shore or non moving boat B such that the at least the weight element 98, distal the bait, hits the bottom 80 of the body of water W and then a next method of use step includes setting the leader apparatus 10 by pulling the rod and real up such as by pulling the rod and real above the head of the user by for example, approximately two feet such that leader apparatus 10 is substantially straitened and lays substantially horizontal on or substantially conforms with the bottom 80 of the body of water W as a result of its designed length, weight, and rigidity and without external leaders weights such that the bait means 88 extends from the second end portion 22 of the non-trolling fishing leader apparatus 10 which also is devoid of external weights proximate the bait means 88 for giving a more impulse free response due to a strike or the taking of the bait means by a fish such that the non-trolling fishing leader apparatus 10 provides a natural feel or a substantially impulse free response for successfully catching big game fish without the unnatural feel or counter force provided from external weight attachments proximate the bait means 88 and wherein this substantially impulse free response continues to be asserted on the fish as the fish lifts the bait means 88 devoid of external weights and continues to lift the leader apparatus having a substantially evenly distributed weight along the length of the leader apparatus 10 and devoid of external weights thereon and wherein in one embodiment, the leader apparatus 10 is further comprised of the sliding weight device 86 slideably coupled to the fishing line between the rod and reel 84 the end of the leader apparatus 10 distal from the coupling of bait means 88 such that the sliding weight device 86 and thus, the weighted element 98 slides on the fishing line in response to the fish for continuing the natural impulse response of the leader for increasing the experience and success of catching big fish.

The above delineation of the non-trolling fishing leader apparatus 10 including its use and operation demonstrates the industrial applicability of this invention.

Moreover, having thus described the present invention, it should be apparent that numerous modifications and adaptations may be resorted to without departing from the scope and fair meaning of the present invention as set forth hereinabove and as described hereinbelow by the claims.

I claim:

1. A method for making a non-trolling fishing leader apparatus for catching big game fish, the steps including:

providing a desired length of braided steel cable having a body wherein said body includes a first end portion terminating to a first end and second end portion terminating to a second end;

placing a first figure-eight crimp on the first end portion of the cable by threading the first end of the first end portion of the cable through a first opening of two openings disposed in the first figure-eight crimp such that the first end of the cable extends beyond the first figure-eight crimp;

placing a first barrel type swivel on the first end portion of the cable by threading the first end of the cable through a first eyelet of two diametrically opposed eyelets of the barrel swivel;

folding back the first end of the cable toward the body of the cable and threading the first end through a second opening of the two openings disposed in the first figure-eight crimp such that a first closed loop is defined and the first barrel swivel is captured;

adjusting the threading of the cable through the two openings of the first figure-eight crimp such that the first closed loop is adjusted to approximately three quarters of an inch at its widest point and such that the first end traversing through the second opening extends beyond the first figure-eight crimp prior to the first end terminating;

retaining the position of the first figure-eight crimp after the adjusting step and placing the first figure-eight crimp in a vise such that the first figure-eight crimp and first closed loop are in a plan substantially parallel to jaws of the vise and closing the vise for applying a great force on the first figure-eight crimp for flatting the first figure-eight crimp for securely closing the first closed loop;

placing a second figure-eight crimp on the second end portion of the cable by threading the second end of the second end portion of the cable through a first opening of two openings disposed in the second figure-eight crimp such that the second end of the cable extends beyond the second figure-eight crimp;

placing a second barrel type swivel of a barrel swivel and clasp combination member on the second end portion of the cable by threading the second end of the second end portion of the cable through a first eyelet of two diametrically opposed eyelets of the barrel swivel;

folding back the second end of the cable toward the body of the cable and threading the second end through a second opening of the two openings disposed in the second figure-eight crimp such that a second closed loop is defined and the second barrel swivel and clasp combination member is captured;

adjusting the threading of the cable through the two openings of the second figure-eight crimp such that the second closed loop is adjusted to approximately three quarters of an inch at its widest point and such that the second end traversing through the second opening of the second figure-eight crimp extends beyond the second figure-eight crimp prior to the second end terminating;

retaining the position of the second figure-eight crimp after the adjusting step and placing the second figure-eight crimp in the vise such that the second figure-eight crimp and second closed loop are in a plan substantially parallel to jaws of the vise and closing the vise for applying a great force on the second figure-eight crimp for flatting the second figure-eight crimp for securely closing the second closed loop thereby making the non-trolling fishing leader apparatus free of external leader weights for catching big game fish.

2. The method of claim 1 further including a step of trimming the first end of the cable extending out the second opening of the first figure-eight crimp.

3. The method of claim 2 further including a step of trimming the second end of the cable extending out the second opening of the first figure-eight crimp.

* * * * *